UNITED STATES PATENT OFFICE.

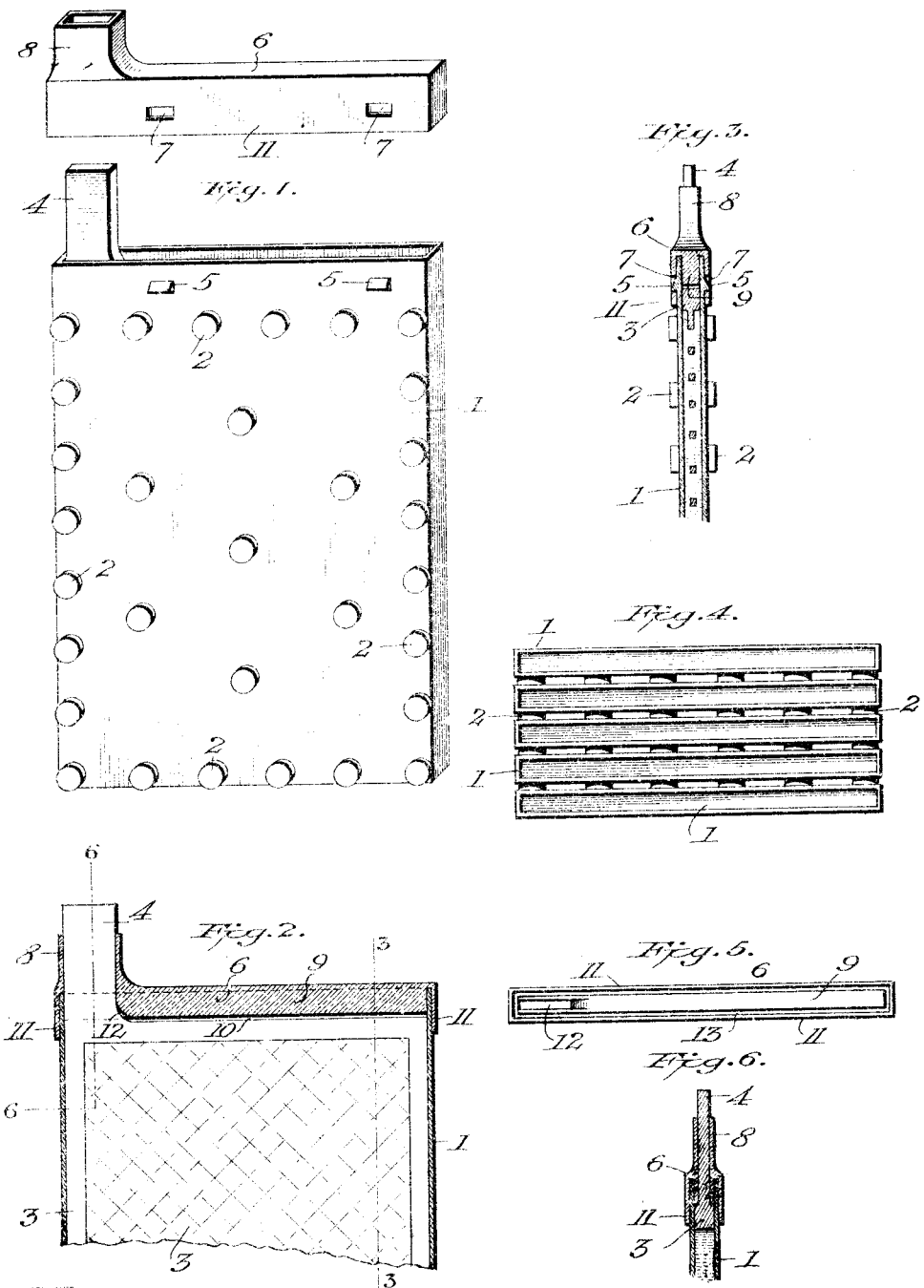

JASPER N. DAVIS, OF DENVER, COLORADO.

STORAGE-BATTERY-SEPARATOR CONSTRUCTION.

1,128,232.

Specification of Letters Patent.

Patented Feb. 9, 1915.

Application filed February 16, 1914. Serial No. 819,004.

*To all whom it may concern:*

Be it known that I, JASPER N. DAVIS, a citizen of the United States of America, residing in the city and county of Denver and State of Colorado, have invented a new and useful Improvement in Storage-Battery-Separator Construction, of which the following is a specification.

This invention relates to improvements in storage battery separator construction.

The object of the invention is to provide a combined separator and envelop of non-conducting, absorbent material adapted to separate and inclose the battery plates, and is so constructed that ample space is provided for the free circulation of the acid between the said plates, the combination separator and envelop being sealed at the open end, thereby inclosing the plates, and preventing any loss of active material from the positive plates.

A further object is to provide an envelop as heretofore explained and described hereinafter that will entirely eliminate all short circuits and the necessity of frequent cleaning, thus not only saving the unnecessary expense occasioned thereby, but contributing greatly to the life of the battery.

Having briefly outlined my improved construction, I will proceed to describe the same in detail, reference being made to the accompanying drawing, in which is illustrated an embodiment thereof.

In this drawing: Figure 1 is a perspective view of my improved combination separator and envelop for storage battery plates, showing a sealing cap therefor, removed and positioned above the envelop, the cap being necessary only for the envelops surrounding the positive plates. Fig. 2 is a vertical, longitudinal sectional view, showing the upper portion of the envelop and cap thereon, together with the plate. Fig. 3 is a vertical transverse sectional view of the same on the line 3—3, Fig. 2. Fig. 4 is a plan view of a plurality of combined envelops and separators, showing their arrangement when placed in a battery cell, the separator spacing projections on the end negative plate envelops being omitted. Fig. 5 is a bottom view of the cap for the combined envelop and separator of the positive plates. Fig. 6 is a vertical transverse sectional view, taken on the line 6—6, Fig. 2.

Referring to the accompanying drawings, let the numeral 1 designate the envelop, which is open at the top end and provided with small spacing lugs or projectors 2, on one side thereof, the opposite side of the envelop having a plain surface, as best illustrated in Fig. 4, the said envelop as shown, constituting an integral structure. A battery plate 3 is placed in the envelop 1, with its connecting lug 4 projecting out of the envelop. The separating lugs 2 (see Fig. 1) form a straight row at the outer sides and ends of the envelop, the object being to bring the greater part of the pressure between the plates on the outer frame of the grid, instead of on the center portion of the plates. At the top of the envelop, however, the lugs 2 are located just below the top of the plate, which will be more fully explained hereinafter. At the top of the envelop are located two projections 5, which are substantially hooked shaped, and which are adapted to hold down in place a cap 6, as shown in Fig. 1, which cap is adapted to be placed upon the upper end of the envelop and plate as is best illustrated in Fig. 2. The cap is provided with openings 7 which are adapted to be engaged by the projections 5, which extend through the openings 7, and hold the cap 6 firmly in place. The hooks 5 and openings 7 are likewise positioned on the opposite side of the cap and envelop. The purpose of this cap is to tightly seal the battery plate within the envelop, thereby preventing any particles of active material upon the plate sealed in the envelop, from passing out at the top end of the envelop into the electrolyte.

Fig. 2 is a sectional view of the cap, envelop and plate, best illustrating the construction of the cap and its coöperation and combination with the envelop and plate.

The cap 6 has a hollow extension 8, through which the connecting lug 4 of the plate passes when the cap 6 is in position upon the envelop, as illustrated in Figs. 2, 3 and 6. The cap 6 is provided with a solid inner integral depending portion 9 which when the cap is in position, extends into the upper end of the envelop, but does not abut against the top of the plate. This construction is important inasmuch as the positive plate sometimes increases its length, and the space 10, between the top of the plate and the depending portion 9 takes care of the expansion and prevents the cap from being forced off. The said part 9 fits closely within the open end of the envelop, thus holding the said end of the envelop to its proper shape. The caps 6 has an outer surrounding flange 11 which when the cap is placed in position, surrounds the outer wall of the envelop (see Figs. 2 and 3). The apertures 7 are formed in the flange 11. The cap 6 may be made of any suitable non-conducting material, which has some elasticity such as celluloid or hard rubber, which will allow the two side flanges 11 to spring sufficiently to permit them to pass over the hooks 5 and then spring back in place tightly against the envelop as shown in Fig. 3.

By reference to Fig. 5, it will be seen that one end of the depending member 9 is formed with an opening 12, which is continued through the extension 8, to receive the connecting lug 4 of the plate, which is of less width than the plates. A space 13 is left between the depending members 9, and the outside flanges 11 of the caps, which receives the upper end of the envelops, and the opening 12 closely surrounds the connecting lug 4.

Fig. 4 shows five envelops with the plates and caps 6 omitted. It is customary to use an odd number of plates in a battery cell, the two outer plates being negative. In this view the arrangement of the envelops with respect to each other as they appear in a fully equipped cell is shown. It is not necessary to have protecting separator spacing lugs 2 on the outside of the outer envelops, because they are not needed between the envelop and the cell jar; therefore in the present construction, I employ one envelop with plain sides in each cell, the separating lugs 2 being omitted.

As shown in Fig. 1, the spacing lugs 2 are irregularly positioned, which affords a better circulation of electrolyte between the plates inclosed in the envelops. The top row of the projections 2, are arranged below the upper edge of the inclosed plate, thereby allowing the outer flange 11 of the cap to pass below the upper end of the plate, thus producing a sealed union between the solid depending portion 9 and the outer flange 11. The tight joint thus formed between the cap and envelop, prevents any particles of disintegrated active material from the positive plates sealed within the envelop, from passing out of the same. It will be seen that the upper end of the opening 12 is above the acid level of the electrolyte in the cell and the upper end of the extension 8 is up against the usual connecting strap which connects in the usual manner all of the positive and negative plates together in their respective groups, thus preventing the only possible escape of said material at the opening 12 of the cap 6, which surrounds the plate connection lug 4, and which is left unsealed for the free escape of gas from the inclosed plate. Therefore, the end of the extension 8, being above the acid level, no particles of disintegrated active material can escape with the usual gasing of the inclosed plates.

Numerous attempts have been made heretofore to provide an envelop or other means which will permanently retain the active material of the plates in lead storage batteries in place, and in close contact with the grid, but such attempts have not so far been a practical success, but the envelop and sealing cap herein described meets all of the requirements wherein other constructions have failed.

This envelop is used on both positive and negative plates, and both can be sealed within the said envelops if desired, but it is only necessary to seal up the positive plates. The negative plates should have their outer supporting grid frame thoroughly insulated and protected from the electrolyte to prevent the enlarging condition of the said grid commonly called "moss grown negatives," which condition makes an unnecessary expense during the life of lead storage batteries, by causing short circuits, and in removing same, when the usual form of open edgewood separators are used. While I have described the lugs as being on one side of the envelops only, I may also if desired, form the envelops with the lugs on both sides, as shown in Fig. 3, in which case the negative plate envelops would be omitted.

In the manufacture of the improved separator, I preferably employ chemically pure asbestos, in connection with a suitable binder, the materials being molded under pressure into envelops as hereinbefore described, of any desired size.

The envelop above described, is not only thoroughly effective in operation, but gives a much longer life and mileage to the battery.

Having thus described my invention, what I claim is:

1. In storage battery separator construction, the combination of an envelop of suitable material having projections on one side thereof, and a cap which incloses the open end of said envelop, having a depending member which fits closely within the said open end, and means releasably connecting the cap and envelop.

2. In storage battery separator construction, the combination of an envelop or non-conducting, absorbent, non-perforated material open at one end and having projecting lugs on one side, and a cap of similar material, which surrounds the said open end, a depending member in said cap which fits closely within the said open end having an opening adjacent one of its ends which extends out through the cap, and means for locking the envelop and cap together.

3. In storage battery separator construction, the combination with a battery plate having a projecting connecting lug, of an envelop of non-conducting absorbent material for said plate, which is open at its upper end and provided with internal projections on one side thereof, a cap adapted to surround the said open end of the envelop having a depending member which fits closely within the said open end and which is provided with an opening which closely surrounds the said connecting lug and locking means for securing the cap upon the envelop.

4. In storage battery separator construction, the combination of a non-perforated absorbent envelop, open at one end and having integral projecting lugs on one side thereof, and a flanged cap therefor, having a vertical extension at one end and an inner depending member spaced on all sides from the flange portion of the cap and having an opening which passes through the said extension, the flange portion of said cap being adapted to surround the open end of the envelop and the depending member to fit closely within the said open end, and locking means for sealing the envelop and cap together.

5. In storage battery separator construction, the combination of an envelop of non-conducting, absorbent material, open at one end and provided on one side with integral spacing lugs, and catches adjacent its open end, and a cap of similar material therefor, having a depending flange portion, and an inner depending member spaced on all sides from the flange portion, a vertical extension on one end of the cap having an opening which extends through the said depending member, the flange portion of said cap being adapted to inclose the open end of the envelop, the said depending member fitting closely therein, the said flange portion having apertures into which the said catches spring, and thereby lock the cap securely to the envelop.

6. In storage battery separator construction, the combination of an envelop of non-conducting, absorbent material, having on one side thereof projecting lugs arranged close together along the side and bottom edges and at greater intervals over the remaining surface, and catches adjacent its open end and on both sides, and a cap for said envelop, having a depending flange portion, an inner depending solid member spaced all around from the flange portion, a vertical extension at one end having an opening extending down through the solid depending member, and apertures in the flange portion; said cap being adapted to surround the open end of the envelop with its depending member fitting closely within the said open end, the catches on said open end being adapted to spring into the apertures in the flange portion of said cap and securely hold the same upon the said envelop.

7. In storage battery separator construction, the combination with a battery plate, having a connecting lug, of an envelop therefor of non-conducting absorbent material open at its upper end, and a cap for said envelop comprising a flange portion adapted to surround the open end of the envelop, an inner solid depending member adapted to extend into the same, a vertical extension having an opening therein which extends down through the said depending member and surrounds the said connecting lug of the plate, and means for locking the cap to the envelop.

8. In storage battery separator construction, the combination with an envelop of suitable material open at one end and having catches adjacent to said open end, of a cap having a depending flange which surrounds the said open end having apertures which are engaged by said catches, thereby to secure the cap upon the envelop and an opening in said cap at one end.

In testimony whereof I affix my signature in the presence of two witnesses.

JASPER N. DAVIS.

Witnesses:
 MARY E. DAVIS,
 IDA L. DAVIS.